United States Patent
Kishimoto

(10) Patent No.: US 8,526,114 B2
(45) Date of Patent: Sep. 3, 2013

(54) METHOD AND APPARATUS TO COMPENSATE FOR MOVEMENT OF AN IMAGING APPARATUS

(75) Inventor: Yuri Kishimoto, Saitama Pref. (JP)

(73) Assignee: Optoelectronics Co., Ltd. (JP)

( * ) Notice: Subject to any disclaimer, the term of this patent is extended or adjusted under 35 U.S.C. 154(b) by 91 days.

(21) Appl. No.: 13/118,050

(22) Filed: May 27, 2011

(65) Prior Publication Data
US 2011/0292517 A1 Dec. 1, 2011

Related U.S. Application Data

(63) Continuation of application No. 12/935,435, filed as application No. PCT/US2008/060291 on Apr. 15, 2008, now abandoned.

(51) Int. Cl.
*G02B 1/06* (2006.01)
(52) U.S. Cl.
USPC .................. 359/666; 359/665; 359/900
(58) Field of Classification Search
USPC ................... 359/666, 290, 291, 665, 900
See application file for complete search history.

(56) References Cited

U.S. PATENT DOCUMENTS

2004/0012683 A1  1/2004  Yamasaki et al.

OTHER PUBLICATIONS

International Search Report and Written Opinion, dated Aug. 27, 2008, of International Application No. PCT/US08/60291, filed: Apr. 15, 2008.
International Preliminary Report on Patentability, dated Oct. 28, 2010, of International Application No. PCT/US08/60291, filed: Apr. 15, 2008.

*Primary Examiner* — Jack Dinh
(74) *Attorney, Agent, or Firm* — Kaplan Breyer Schwarz & Ottesen, LLP

(57) ABSTRACT

An imaging apparatus is compensated for its movement during image acquisition of an object by acquiring the image through a lens subassembly in the apparatus which includes a liquid lens, sensing movement of the apparatus during image acquisition, and controlling the liquid lens to compensate for the effects on the image of movement of the apparatus. Preferably, the liquid lens is controlled so as to change its focal length.

23 Claims, 4 Drawing Sheets

METHOD AND APPARATUS TO COMPENSATE FOR MOVEMENT OF AN IMAGING APPARATUS

This patent application is a continuation of U.S. patent application Ser. No. 12/935,435, filed Sep. 29, 2010 now abandoned; which was the U.S. national stage of International Application No. PCT/US08/60291 filed Apr. 15, 2008, designating the United States of America, and published in English on Oct. 22, 2009, under International Publication Number WO 2009/128817. The aforementioned applications are hereby incorporated by reference in their entireties.

BACKGROUND ART

The present invention relates generally to a method and apparatus for compensating for movement of an imaging apparatus during image acquisition, for example camera shaken in a handheld camera and, more specifically, concerns such compensation in the context of a bar code scanner.

With the increasing resolution of digital cameras, the number of photons available to a pixel of an image area sensor in a typical photograph is decreasing rapidly. Since the photo detector of each pixel must integrate light in order to obtain a usable signal, it is not unusual to find integration times as long as 50 milliseconds in today's cameras. Unfortunately, this is a fatally long time to take a picture without a tripod. As a result, the camera moves during the integration period, resulting in a blurred image. This is particularly problematic when the camera is attempting to read a scanned code, such as a barcode or a two dimensional code.

Camera shake is a problem that is well known in photography. The art has established methods for compensation, commonly referred to as "image stabilization." Two general types of technologies have been used: optical methods and electronic methods. In optical methods, camera movement is detected by sensors, such as gyro sensors and acceleration sensors, and it is compensated by physically moving a lens or imager. Optical methods tend to be less reliable and stable than electronic methods, since they require moving parts. Electronic methods estimate image movement and process the image to compensate for the movement. Although more reliable, electronic methods are very processor intensive and time consuming. They can take as long as a few seconds. In some applications, such as bar code and two dimensional code scanners, image stabilization in less than 200 milliseconds is typically required.

Initially, we will define the different types of movement referred to herein, as demonstrated by the perspective drawing of FIG. 1. Movement will be defined in a three dimensional Cartesian coordinate system, as seen looking at the object being imaged, with the imaging device at the origin. The "X" coordinate is the horizontal axes increasing to the right, the "Y" coordinate is the vertical axes, increasing upwardly, and the "Z" coordinate is the depth of the image, increasing towards the object. "Pitch" is rotation about the X axes, "yaw" is rotation about the Y axes, and "roll" is rotation about the Z axes. In all cases, clockwise rotation will be considered positive. (See FIG. 1)

Referring to FIG. 2, there are illustrated the effects of translation and rotational movement on the image of the object being imaged. "Translation" (FIG. 2(*a*)) is movement along one of the axes, while "rotation" is angular movement about one of the axes. It should be noted that the total movement of the object relative to the sensor increases with distance under rotation, whereas it remains constant with translation. Typical photography, taking place at a distance from the object will therefore be particularly sensitive to rotational shake and translational movement has typically been ignored.

However, in certain applications, such as a code scanner, the object is commonly within a range of approximately 50 millimeters to approximately 200 millimeters from the sensor. In the present disclosure, such codes scanners will be considered to be operating in the "near" field. In the near field, the image must be stabilized with respect to both translation and rotation, which are comparable. This imposes far more stringent requirements on image stabilization.

DISCLOSURE OF INVENTION

In accordance with the present invention, an imaging apparatus is compensated for its movement during image acquisition of an object by acquiring the image through a lens subassembly in the apparatus which includes a liquid lens, sensing movement of the apparatus during image acquisition, and controlling the liquid lens to compensate for the effects on the image of movement of the apparatus. Preferably, the liquid lens is controlled so as to change its focal length.

In accordance with one aspect of the invention, the object is in a near field of the imaging device and both translational and rotational movement of the apparatus are sensed.

BRIEF DESCRIPTION OF DRAWINGS

The foregoing brief description and further objects, features and advantages of the present invention would be understood more completely from the following detailed description of presently preferred, but nonetheless illustrative, embodiments in accordance with the present invention, with reference being had to the accompanying drawings in which.

BEST MODE OF CARRYING OUT INVENTION

Figure 1:
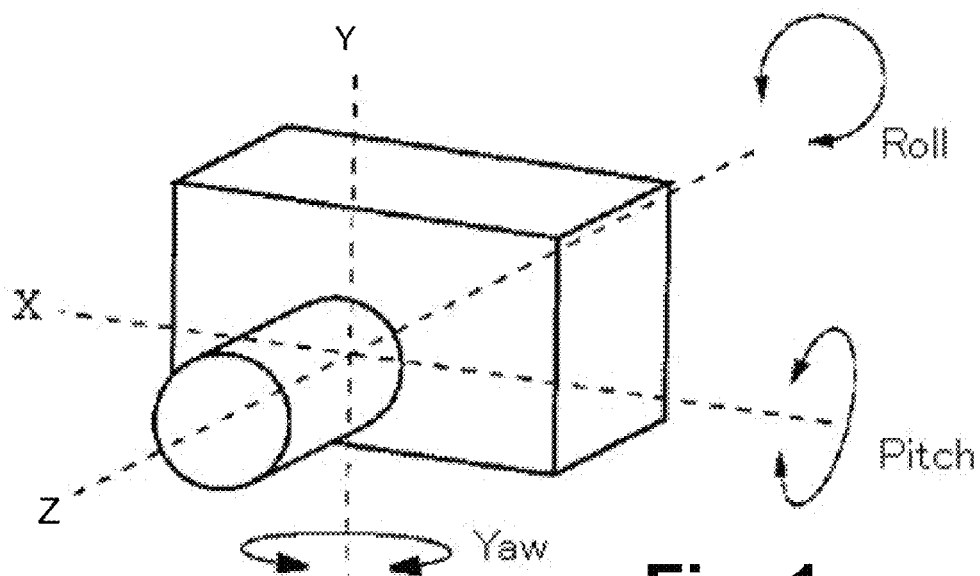
FIG. 1 is a perspective drawing illustrating the different types of image sensor movement referred to herein.
Figure 2:
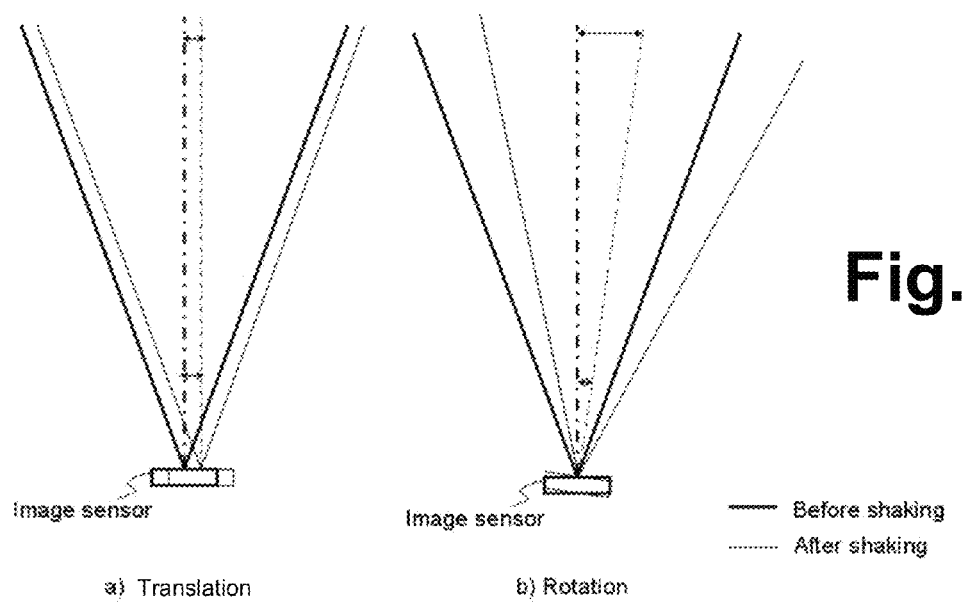
FIG. 2, comprising FIG. 2(*a*) and FIG. 2(*b*), illustrates the effects of translation and rotational movement on the image.
Figure 3:
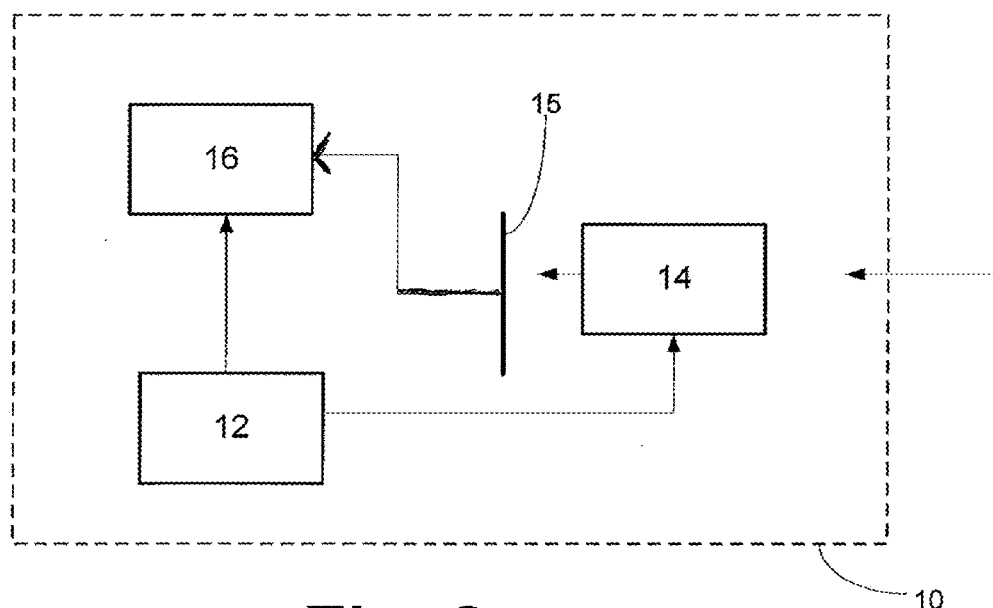
FIG. 3 is disclosed a block diagram of a code reader embodying the present invention.

Referring to FIG. 3, there is disclosed a generalized block diagram of a code reader 10 embodying the present invention. The code reader broadly comprises a movement sensing subassembly 12 the outputs of which controls an optical assembly 14 to compensate optically for movements sensed by subassembly 12. The modified images are then provided to an image sensor 15, the output of which is received by a processing subassembly unit 16. In processing unit 16, processing of the image will typically take place in order to compensate for some of the movement detected by subassembly 12 and to extract the imaged code. As a result, the processed image produced by processing unit 16 will have an image stabilized for translational and rotational shake of the scanner 10.

Figure 4:
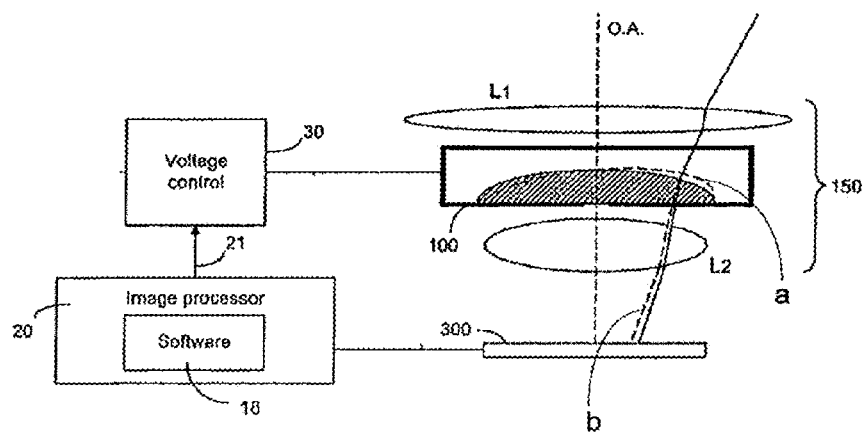
FIG. 4 is a schematic diagram illustrating a preferred version of a lens subassembly incorporating a liquid lens.

FIG. 4 is a schematic diagram illustrating a preferred version of optical subassembly 14. This assembly includes a lens subassembly 150 which includes optional conventional lenses L1 and L2, as well as a liquid lens 100. A liquid lens is an electronically controlled device in which the shape of an interface between two liquids defines an optical lens and may be modified by an applied controlled voltage. Such lenses are presently known in the art.

In this case, voltages to vary the three dimensions of lens 100 are applied from a voltage control 30 determine the shape of the interface between the two liquids and, therefore, the effect of the liquid lens. For example, by appropriately changing the curvature of the interface, the effective focal length of lens 100 may be changed to move the focal length an appropriate amount to compensate for the shaking of the camera. This correction of the focal length is achieved without any moving mechanical parts. The voltages produced by voltage control 30 are, in turn, controlled by an image processor 20 (part of processor 16), which utilizes software 18. This image processor is responsive to information derived from the movement sensing subassembly 12.

For example, the movement sensing subassembly 12, could have a distance sensor to sense movement of the scanner 10 along the Z axis. Or it could have gyro sensors to sense rotational movements. Those skilled in the art will appreciate that by sensing pitch and yaw and the distance of the object, it is possible to derive the amount of object movement.

Figure 5:
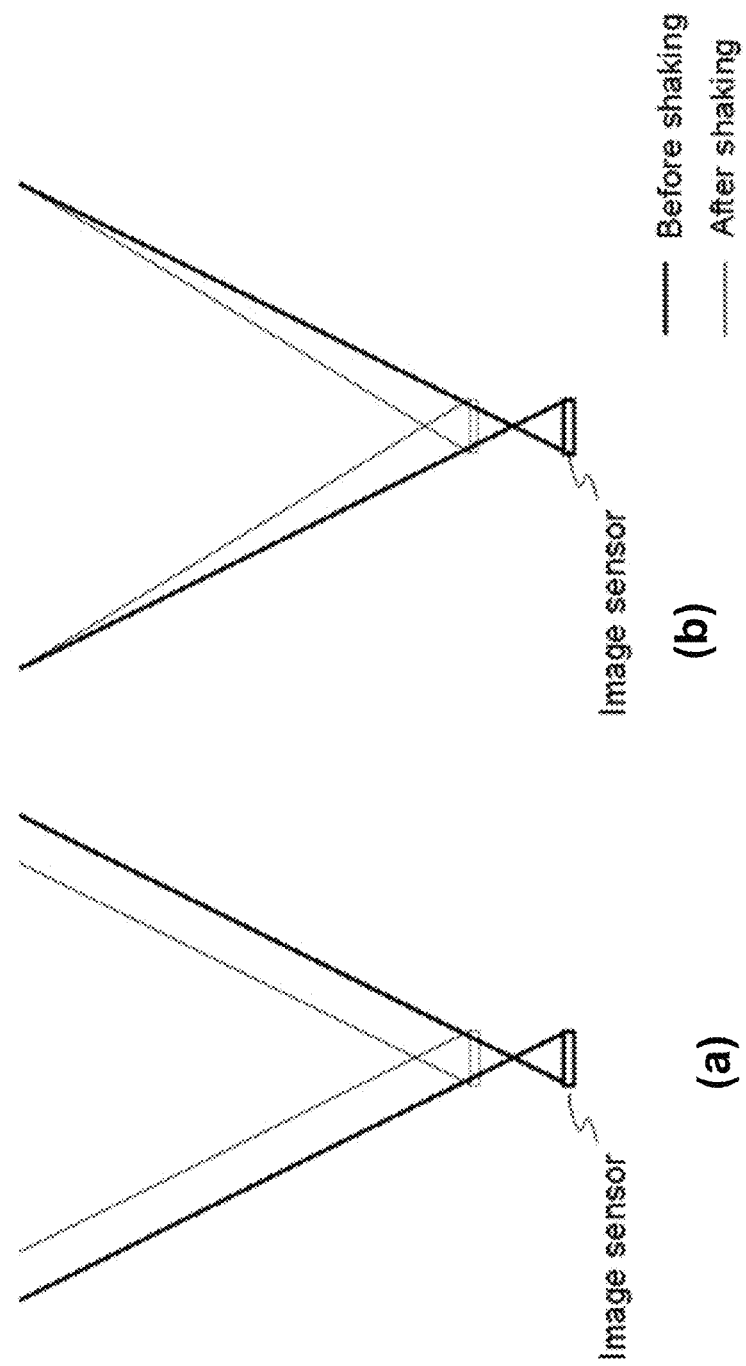
FIG. 5, comprising FIGS. 5(*a*) and 5(*b*) illustrates the effect of the Z-axes movement towards the object and its compensation, in accordance with one aspect of the present invention.

FIG. 5, comprising FIGS. 5(a) and 5(b), illustrates the effect of Z-axis movement towards the object and its compensation in accordance with one aspect of the present invention. Effectively, the entire field observed by the sensor is reduced. Upon such movement in the Z-axis being sensed, processor 20 operates voltage control 30 to cause the focal length of lens 100 to be reduced, widening the field of lens assembly 150, in order to restore the original field of view. This, in effect, compensates for the Z-axes movement.

It is also contemplated that lens 100 could be controlled so as to shift its center of curvature, as illustrated by the dashed lines a, b in FIG. 4, in order to compensate for translational movement of the scanner 10 along the X and Y axes.

Figure 6:
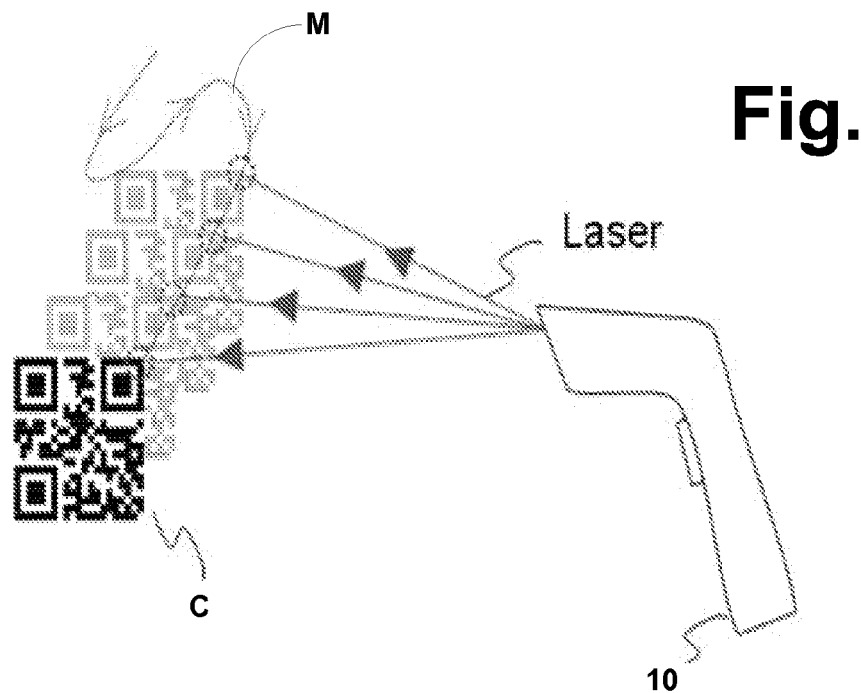
FIG. 6 is a perspective view showing a scanner in use which incorporates laser tracking.
Figure 7:
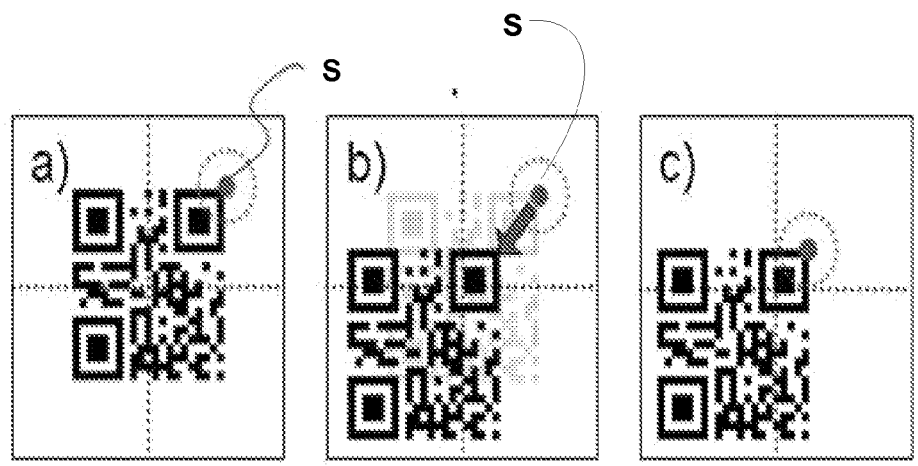
FIG. 7, comprising FIGS. 7(*a*), (*b*) and (*c*), illustrates the operation of laser tracking.

It is also contemplated that the movement sensor subassembly 12 could include laser tracking. FIG. 6 illustrates an example of scanner 10 utilized to scan a two dimensional code C. As illustrated, it is assumed that scanner 10 exhibits a diagonal shaking movement M relative to the code C. In this case, as illustrated in FIGS. 7(a) and 7(b) a reference laser beam is provided by scanner 10 and the spot S it produces a sensed in the within the image. When image processor 20 senses movement of the spot S relative to the code C, it can immediately compensate the image, as shown in FIG. 7(c).

The liquid lens is controlled by the feedback provided due to the movement of the camera. The liquid lens has plural electrodes that are energized differently, depending upon the required correction. Specifically, the curvature of the liquid lens surface may be changed, or the center of the lens may be offset upwardly or downwardly, or leftward or rightward, depending upon the motion detected. Thus, the correction of the movement occurs without moving parts, but by re-adjusting the liquid lens to account for it. Although preferred embodiments of the invention have been disclosed for illustrative purposes, those skilled in the art will appreciate that many additions, modifications and substitutions are possible without departing from the scope and spirit of the invention as defined in the accompanying claims.

What is claimed is:

1. A method for compensating an imaging apparatus for its movement during image acquisition of an object, comprising: acquiring the image through a lens subassembly in the apparatus which includes a liquid lens;
sensing movement of the apparatus during image acquisition, wherein said sensing step comprises determining translational movement of the image on an image sensor by sensing rotational movement of the apparatus and the distance of the object from the apparatus; and
controlling the liquid lens to compensate for the effects on the image of movement of the apparatus.

2. The method of claim 1 wherein the liquid lens is controlled so as to change its focal length.

3. The method of claim 2 wherein the focal length of the liquid lens is decreased and increased, respectively, with movement towards and away from the object.

4. The method of claim 3 wherein movement is sensed by means of at least one of a gyro sensor, an acceleration sensor and a laser tracking device.

5. The method of claim 1 wherein said object is in a near field of said imaging device.

6. The method of claim 5 wherein the distance between the apparatus and the object is in the range of approximately 50 mm and approximately 200 mm.

7. The method of claim 6 wherein said sensing step comprises sensing translational and rotational movement of the apparatus.

8. The method of claim 5 wherein said sensing step comprises sensing translational and rotational movement of the apparatus.

9. The method of claim 1 wherein said sensing step comprises sensing translational and rotational movement of the apparatus.

10. In an imaging apparatus, for compensating the apparatus for its movement during image acquisition of an object, the combination of:
a lens subassembly in the apparatus which includes a liquid lens, for acquiring the image;
a movement sensor sensing movement of the apparatus during image acquisition, wherein said movement sensor senses translational movement of the image on an image sensor by sensing rotational movement of the apparatus and the distance of the object from the apparatus; and
a controller controlling the liquid lens to compensate for the effects on the image of movement of the apparatus.

11. The combination of claim 10 wherein the controller controls liquid lens so as to change its focal length.

12. The combination of claim 11 wherein the controller respectively decreases and increases the focal length of the liquid lens with movement towards and away from the object.

13. The combination of claim 12 wherein the movement sensor is one of a gyro sensor, an acceleration sensor and a laser tracking device.

14. The combination of claim 10 wherein said object is in a near field of said imaging device.

15. The combination of claim 14 wherein the distance between the apparatus and the object is in the range of approximately 50 mm and approximately 200 mm.

16. The combination of claim 15 wherein said movement sensor senses translational and rotational movement of the apparatus.

17. The combination of claim 14 wherein said movement sensor senses translational and rotational movement of the apparatus.

18. The combination of claim 10 wherein said movement sensor senses translational and rotational movement of the apparatus.

19. An imaging apparatus including a symbol decoder, a liquid lens, at least one detector for detecting movement in at least two dimensions, and a controller, said liquid lens being controllable to reconfigure it by control of voltage on plural electrodes, said controller receiving input from said at least one detector, and for controlling voltage on the electrodes to reconfigure the liquid lens in plural dimensions to compensate for undesired movement of the imaging apparatus, wherein said at least one detector senses translational movement of an image on an image sensor by sensing rotational movement of the imaging apparatus and the distance of a symbol from the imaging apparatus.

20. The imaging apparatus of claim 19 wherein the plural dimensions are three dimensions.

21. The imaging apparatus of claim 19 wherein different sets of electrodes control configuration of the liquid lens in different dimensions.

22. The imaging apparatus of claim 19 wherein a common set of electrodes control configuration of the liquid lens in different dimensions.

23. The imaging apparatus of claim 19 wherein said electrodes operate to move a center of said liquid lens to a new position by deforming said liquid lens.

* * * * *